US012729910B2

(12) United States Patent
Büngener et al.

(10) Patent No.: US 12,729,910 B2
(45) Date of Patent: Sep. 8, 2026

(54) METHOD FOR DRYING A MATERIAL FOR IRRADIATION, AND INFRARED IRRADIATION DEVICE FOR CARRYING OUT SAID METHOD

(71) Applicant: Excelitas Noblelight GmbH, Hanau (DE)

(72) Inventors: Jens Büngener, Kleinostheim (DE); Doerte Eggers, Kleinostheim (DE); Vincent Krafft, Kleinostheim (DE); Michael Tittmann, Kleinostheim (DE); Larisa Von Riewel, Kleinostheim (DE)

(73) Assignee: Excelitas Noblelight GmbH, Hanau (DE)

( * ) Notice: Subject to any disclaimer, the term of this patent is extended or adjusted under 35 U.S.C. 154(b) by 726 days.

(21) Appl. No.: 17/996,412

(22) PCT Filed: Apr. 21, 2021

(86) PCT No.: PCT/EP2021/060355
§ 371 (c)(1),
(2) Date: Oct. 17, 2022

(87) PCT Pub. No.: WO2021/214128
PCT Pub. Date: Oct. 28, 2021

(65) Prior Publication Data

US 2023/0221071 A1 Jul. 13, 2023

(30) Foreign Application Priority Data

Apr. 22, 2020 (DE) ..................... 10 2020 110 912.1

(51) Int. Cl.

| | |
|---|---|
| ***F26B 3/30*** | (2006.01) |
| ***B41J 11/00*** | (2006.01) |
| ***F26B 21/37*** | (2026.01) |

(52) U.S. Cl.
CPC ........... *F26B 3/30* (2013.01); *B41J 11/00216* (2021.01); *F26B 21/37* (2026.01)

(58) Field of Classification Search
CPC .......... F26B 3/30; F26B 21/12; F26B 13/104; F26B 21/004; B41J 11/00216; B41F 23/0413; D21F 5/002
See application file for complete search history.

(56) References Cited

U.S. PATENT DOCUMENTS

| | | | |
|---|---|---|---|
| 3,286,369 | A | 11/1966 | Smith, Jr. |
| 4,594,795 | A | 6/1986 | Stephansen |

(Continued)

FOREIGN PATENT DOCUMENTS

| | | | |
|---|---|---|---|
| AT | 66 262 | T | 8/1991 |
| CN | 1922457 | A | 2/2007 |

(Continued)

OTHER PUBLICATIONS

International Search Report and Written Opinion for International Application No. PCT/EP2021/060355 mailed Aug. 6, 2021.

(Continued)

*Primary Examiner* — David J Laux
(74) *Attorney, Agent, or Firm* — Wolf, Greenfield & Sacks, P.C.

(57) ABSTRACT

Known infrared irradiation devices for drying a material for irradiation that is moved through a process chamber have a radiator unit with at least one infrared radiator for emitting infrared radiation and have a counter-reflector with a reflector wall, wherein the reflector wall has a plurality of inlet openings for admitting cooling gas into the reflector space. Proceeding from this, in order to provide an irradiation device for the drying method, which irradiation device is, in particular for drying solvent-containing and in particular water-based printing ink, distinguished by high-speed dry- (Continued)

Figure 1:
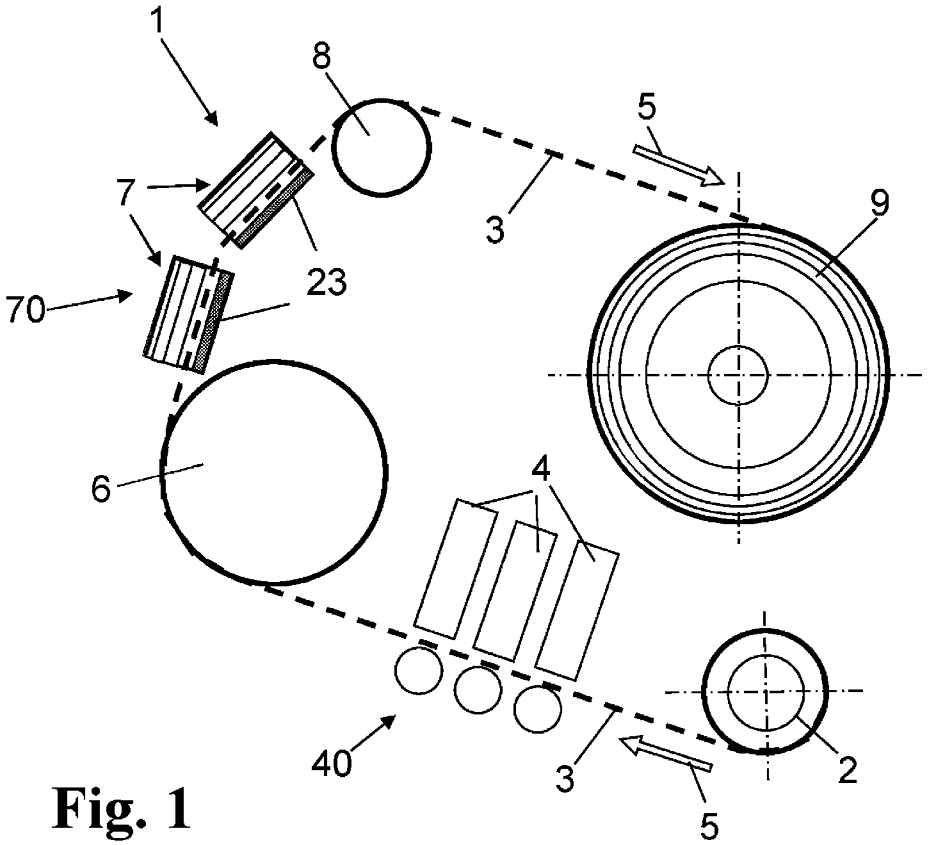

ing with a low level of bubble formation and a low level of condensation in the reflector space at the same time, it is proposed that the reflector wall has at least one outlet opening for conducting waste air out of the reflector space.

22 Claims, 3 Drawing Sheets

(56) References Cited

U.S. PATENT DOCUMENTS

| | | | | |
|---|---|---|---|---|
| 4,882,852 | A * | 11/1989 | Kautto .................. | F26B 23/001 34/68 |
| 4,949,478 | A * | 8/1990 | Socha ..................... | F26B 13/10 34/629 |
| 2014/0237844 | A1* | 8/2014 | Boland ................. | F26B 21/004 34/267 |
| 2015/0202892 | A1 | 7/2015 | Jessen | |
| 2020/0164662 | A1* | 5/2020 | Yamada ............... | B41J 2/04563 |

FOREIGN PATENT DOCUMENTS

| | | | |
|---|---|---|---|
| CN | 102592835 | A | 7/2012 |
| CN | 103398567 | A | 11/2013 |
| CN | 203443278 | U | 2/2014 |
| CN | 104061768 | A | 9/2014 |
| CN | 104368510 | A | 2/2015 |
| CN | 207214767 | U | 4/2018 |
| CN | 207527917 | U | 6/2018 |
| CN | 110546005 | A | 12/2019 |
| DE | 102006029252 | A1 | 12/2007 |
| DE | 102007058324 | A1 | 6/2009 |
| DE | 102018101053 | A1 | 5/2019 |
| EP | 2232181 | B1 | 8/2012 |
| JP | S4992649 | A | 9/1974 |
| JP | 2002267356 | A | 9/2002 |
| JP | 2006226629 | A | 8/2006 |
| JP | 2012146851 | A | 8/2012 |
| WO | 2010089936 | A1 | 8/2010 |

OTHER PUBLICATIONS

International Preliminary Report on Patentability for International Application No. PCT/EP2021/060355 mailed Nov. 3, 2022.

Communication pursuant to Article 94(3) EPC for European Application No. 21721440.2 dated Jul. 23, 2024.

Office Action issued Jun. 3, 2023 in CN Application No. 202180029410.7 (Machine translation).

* cited by examiner

METHOD FOR DRYING A MATERIAL FOR IRRADIATION, AND INFRARED IRRADIATION DEVICE FOR CARRYING OUT SAID METHOD

CROSS-REFERENCE TO RELATED APPLICATIONS

This application is a 35 U.S.C. § 371 National Phase filing of International Application No. PCT/EP2021/060355, filed on Apr. 21, 2021, entitled "METHOD FOR DRYING A MATERIAL FOR IRRADIATION, AND INFRARED IRRADIATION DEVICE FOR CARRYING OUT SAID METHOD," which claims priority to and the benefit of German Patent Application No. 102020110912.1, filed on Apr. 22, 2020.

TECHNICAL BACKGROUND

The invention relates to a method for at least partially drying a material for irradiation that is moved through a process chamber in a transportation direction and in a transportation plane, wherein the transportation plane divides the process chamber into an irradiation space and into a reflector space, comprising the method steps:

(a) Emission of infrared radiation in the direction of the material for irradiation by means of a radiator unit comprising at least one infrared radiator, and
(b) Reflecting infrared radiation back onto the material for irradiation by means of a counter-reflector, which has a reflector wall facing the transportation plane, wherein a cooling gas is introduced into the reflector space via inlet openings in the reflector wall.

In addition, the invention relates to an infrared irradiation device for drying a material for irradiation that is moved through a process chamber in a transportation direction and in a transportation plane, wherein the transportation plane divides the process chamber into an irradiation space and into a reflector space, having a radiator unit with at least one infrared radiator for emitting infrared radiation into the irradiation space, and having a counter-reflector with a reflector wall facing the transportation plane, wherein the reflector wall has a plurality of inlet openings for admitting cooling gas into the reflector space.

Infrared irradiation devices of this kind are used, for example, for drying inks, paints, lacquers, adhesives or other solvent-containing layers, in particular for drying printing substrate made of paper, card, cardboard, film or textiles in sheet or web form.

PRIOR ART

The radiator unit comprises at least one, generally a plurality of infrared radiators. These radiators have, for example, an emission wavelength in the range of about 800 to 2750 nm and generally have to be actively cooled, in particular in tight installation spaces, such as are typical, for example, in printing presses. In particular when using operational radiation in the short-wavelength infrared range, the transmissivity of printing substrate can be high, such as in the case of paper, for example. For this reason, in applications of irradiation devices operating in near infrared (between 800 and 1500 nm), a counter-reflector is often provided on the side of the printing substrate facing away from the radiator unit. One of its main functions is to increase the efficiency of the heating or drying process by means of multiple reflections.

An effective and rapid drying of the printing substrate requires high radiation flux densities. For this purpose, active cooling proves to be essential for dissipating from the process chamber the heat introduced by the radiator unit. Modern IR irradiation devices therefore have an air management system for regulating the supply air and waste air of process gas for drying and also for cooling.

EP 2 232 181 B1, for example, describes an IR irradiation device in a chamber design for drying a coating on a quasi-endless carrier which is guided through a transportation channel for material for irradiation. On one side of the transportation channel, a plurality of infrared radiators emitting IR radiation are combined into a radiator block. Opposite thereto and on the other side of the transportation channel, a counter-reflector block is arranged. The IR irradiation device is surrounded by a housing which is made of metal profiles and in which fans for cooling the radiators, the material for irradiation and the counter-reflector are accommodated.

A function of the counter-reflector is to reflect the radiation transmitted through the material for irradiation in order to intensify by multiple reflection the infrared irradiation on the material for irradiation itself. Another function of the counter-reflector is to act as a water- or air-cooled thermal insulator in order to protect other components of the installation from heat.

U.S. Pat. No. 4,882,852 A discloses a device and a method for drying a moving web-shaped material according to the generic type mentioned at the beginning. The infrared dryer comprises two infrared radiators which are assigned to the upper side of the web-shaped material. A counter-reflector is assigned to the underside of the material. In order to ensure that cooling air flows evenly around both the upper side and the underside of the material, the counter-reflector has a plurality of air outlet openings.

Technical Object

Typical ingredients of paints and printing inks are oils, resins, water and binders. In the case of printing inks and varnishes containing solvents and above all water, drying is required, which can be based on physical drying processes through the use of temperature and convection.

A conventional drying strategy has two stages. In the first drying phase, a rapid preliminary drying by infrared radiation is aimed at in order to heat the printing substrate and bring the printing ink as quickly as possible to the so-called "gel point." At the gel point, the binders form a three-dimensional network in which color pigments are enclosed. With the further removal of solvents and other components, a further immobilization occurs and the so-called "critical point" is reached. The network structure is so rigid here that the binders and the pigment are no longer able to move.

In the second drying phase, final drying takes place, which only brings about the removal of residual moisture, whereby convective drying measures are also applied.

It has been found that, in the printing substrate, oval bubbles often form which protrude on both sides of the printing substrate and which no longer reverse this formation in the further drying process, which is also referred to as the "blustering effect."

The invention is therefore based on the object of specifying a drying method which is effective and fast on the one hand, and which leads to an improved result in a reproducible manner as regards the bubble formation mentioned, and which prevents condensation in the reflector space as much as possible.

In addition, the object of the invention is to provide for the drying method an irradiation device, which is distinguished in particular for drying solvent-containing and in particular water-based printing ink by high-speed drying with a low level of bubble formation, and which prevents condensation in the reflector space as much as possible.

GENERAL DESCRIPTION OF THE INVENTION

As regards the method, this object is achieved according to the invention proceeding from a method of the generic type mentioned at the beginning in that waste air is conducted out of the reflector space via at least one outlet opening in the reflector wall.

The transportation plane divides the process chamber into two half-chambers, one of which extends between the reflector wall and the material for irradiation and is referred to herein as the "reflector space."

The counter-reflector has a gas-permeable reflector wall. The cooling gas flowing out of the inlet openings into the reflector space impinges on the material for irradiation, namely on the side of the material for irradiation facing away from the radiator unit. This side is generally not coated and is also referred to below as the "rear side" of the material for irradiation. The cooling gas on the one hand cools the reflector wall and on the other hand interacts with the material for irradiation by cooling it and possibly also contributing to drying. As a result, the above-described blustering effect can be reduced.

It has been found that the formation of bubbles is caused by water vapor enclosed in the material for irradiation. The sudden temperature increase due to the infrared radiation leads to a rapid volume expansion of the water vapor. If the material for irradiation is not sufficiently permeable, which is regularly the case, for example, with coated paper, the water vapor can no longer escape completely before the critical point is reached and can break up the internal structure of the printing substrate.

In order to achieve complete drying of all printing inks within the prespecified (brief) period of time, the irradiation power must be adapted to the least absorbent printing ink. For this reason, high temperature peaks can occur particularly during the drying of coatings with a color component in the black or cyan ranges which absorb infrared radiation particularly well. The cooling of the material for irradiation by the cooling gas flowing onto the rear side of the material for irradiation counteracts a too rapid and excessive heating of the material for irradiation in the first drying phase, i.e., more precisely, between reaching the gel point and reaching the critical point, which contributes to a comparatively gentle drying of the material for irradiation in this drying phase. As a result, the radiation output and thus the transportation speed can be increased without damaging the material for irradiation or the coating thereon.

The gas-permeable counter-reflector thus not only fulfills the usual functionalities described above but, as a result of the introduction of the cooling gas through the inlet openings in the reflector wall, also brings about an interaction with the material for irradiation that is moved in the transportation plane, which enables a controlled temperature development in the material for irradiation, which can reduce the occurrence of undesirable phenomena, such as bubble formation.

Waste air is discharged from the reflector space via at least one outlet opening in the gas-permeable reflector wall, preferably via a plurality of outlet openings.

The moisture contained in varnishes or paints evaporates during heating and can condense at cooler locations, such as on the actively cooled wall of the counter-reflector, and form encrustations there and impair the functionality of the installation, for example the reflectivity of the counter-reflector. If the reflector wall has inlet openings for the cooling gas and has an outlet opening or a plurality of outlet openings through which waste air is discharged from the reflector space, moisture can also be removed from the rear-side region of the material for irradiation with the waste air, and condensation can thus be prevented.

In a preferred method variant, it is provided that the quantity of cooling gas introduced into the reflector space varies as viewed in the transportation direction.

The quantity of cooling gas can be varied continuously or stepwise. It is, for example, achieved by a location-dependent control of the quantity of cooling gas introduced through the inlet openings and/or by the total opening cross-section of the inlet openings increasing or decreasing in uniformly large partial areas of the gas-permeable reflector wall as viewed in the transportation direction.

In a preferred procedure, the temperature of the material for irradiation is measured at a plurality of positions distributed along the process chamber in the transportation direction.

By means of temperature measurement at a plurality of positions, for example at 2 to 8 positions, preferably at 2 to 5 positions, a temperature profile over the material for irradiation during its movement through the process chamber is obtained. The temperature profile can be used for regulating the quantity of cooling gas In a preferred method variant, it is provided that waste air is discharged from the reflector space via a plurality of outlet openings in the gas-permeable reflector wall. In a further method variant, it is provided that the cooling gas flows through the inlet openings into the reflector space from a gas distribution chamber adjoining the gas-permeable reflector wall.

The gas-permeable reflector wall here closes off the gas distribution chamber on one side. The cooling gas is introduced into the gas distribution chamber at one point or at a plurality of points and flows out of the gas distribution chamber through the inlet openings in the reflector wall into the reflector space. A uniform cooling gas pressure can be set within the gas distribution chamber so that the quantity of the outflowing gas is determined solely by the distribution and the opening cross-section of the inlet openings.

Preferred procedures of the method in which the gas-permeable reflector wall is part of a gas distribution chamber are explained below.

In this context, it has also proven advantageous if the gas distribution chamber is divided into a plurality of sub-chambers, wherein the quantity of cooling gas flowing through inlet openings into the reflector space varies from sub-chamber to sub-chamber as viewed in the transportation direction.

In the fluidically separated sub-chambers inside the gas distribution chamber, mutually independent pressures of the cooling gas can be set. The quantity of cooling gas flowing out of a particular sub-chamber into the reflector space then depends on the respective gas pressure and the respective total opening cross-section of the inlet openings. In the event of an increase in the quantity of cooling gas, a temperature of the material for irradiation which increases in the transportation direction can be at least partially compensated.

In this context, a method variant is preferred in which at least one first of the sub-chambers is provided with a first cooling gas connection via which a first cooling gas stream is supplied to first inlet openings, and in which a second of the sub-chambers is provided with a second cooling gas connection via which a second cooling gas stream is supplied to second inlet openings, wherein the first cooling gas stream can be adjusted independently of the second cooling gas stream.

The gas distribution chamber is advantageously provided with a waste air connection via which at least a part of the waste air is discharged from the reflector space. In the case of the gas distribution chamber being divided into a plurality of sub-chambers, it has also proven advantageous if at least one of the sub-chambers is provided with such a waste air connection.

In this case, in addition to the inlet openings, the gas-permeable reflector wall also has outlet openings which open into the sub-chamber with the waste air connection. Spent waste air is removed from the reflector space through the outlet openings and is sucked into the sub-chamber equipped with the waste air connection and is discharged further from there. Due to a separate controllability of the waste air and the cooling gas supply air, an extensive extraction of moisture-laden waste air from the reflector space can be ensured and condensation can be prevented.

The cooling of the counter-reflector and the interaction of the cooling gas with the material for irradiation are preferably carried out independently of a process gas quantity controller by means of which process gas is introduced into the process chamber via a supply air unit and spent waste air is discharged from the process chamber via a waste air unit.

The process gas serves primarily to carry moisture away from the material for irradiation, whereas the cooling gas is primarily used for controlling the temperature of the counter-reflector and of the material for irradiation. The two functions can be fulfilled by one and the same gas; in the simplest case, the process gas and the cooling gas are air.

As regards the irradiation device, the above-mentioned object is achieved according to the invention, proceeding from a device of the generic type mentioned at the beginning, by the reflector wall having at least one outlet opening for conducting waste air out of the reflector space.

The transportation plane divides the process chamber into two half-chambers, one of which extends between the reflector wall and the material for irradiation and is referred to herein as the "reflector space." The inlet openings are designed in such a way that cooling gas flows through them into the reflector space and impinges on the material for irradiation, specifically on the rear side of the material for irradiation that faces away from the radiator unit. The cooling gas on the one hand cools the reflector wall and on the other hand interacts with the material for irradiation by cooling it and possibly also contributing to drying. As a result, the blustering effect can be reduced, as explained in more detail above with reference to the method according to the invention.

The gas-permeable counter-reflector not only fulfills the usual functionalities described above but, as a result of the introduction of cooling gas through the inlet openings in the reflector wall, also brings about an interaction with the material for irradiation that is moved in the transportation plane, which enables a controlled temperature development in the material for irradiation, which can reduce the occurrence of phenomena, such as bubble formation.

The gas-permeable reflector wall has at least one outlet opening, preferably a plurality of outlet openings for conducting waste air out of the reflector space.

If, in addition to the inlet openings for the cooling gas, the reflector wall also has one outlet opening or a plurality of outlet openings for discharging waste air from the reflector space, moisture is also removed with the waste air and condensation is thus prevented.

In a preferred embodiment of the irradiation device, the number and/or the opening cross-section of the inlet openings varies in the transportation direction.

As a result, it is possible to continuously or stepwise change the quantity of cooling gas flowing into the reflector space via the inlet openings. A variation of the opening cross-section is measured by whether the total opening cross-section of the inlet openings, determined in the uniformly large partial areas of the reflector wall, increases or decreases as viewed in the transportation direction.

It has proven advantageous if the reflector wall is divided into a plurality of sections as viewed in the transportation direction and that the number and/or the total opening cross-section of the inlet openings varies from section to section.

As a result, the sections of the reflector wall differ in their permeability to the cooling gas in the sense that the gas permeability increases or decreases from section to section. The gas permeability increasing in the transportation direction makes it possible for an increasing quantity of cooling gas to flow into the reflector space and to be able to at least partially compensate for a temperature of the material for irradiation which increases in the transportation direction. A one-piece design of the reflector wall is also preferred when the gas-permeable reflector wall is divided into a plurality of differently designed sections.

In a particularly proven embodiment of the irradiation device, a plurality of temperature sensors is distributed along the reflector wall as viewed in the transportation direction.

By means of the temperature sensors, the temperature of the material for irradiation can be captured during its movement through the process chamber at a plurality of positions, for example at 2 to 8 positions, preferably at 2 to 5 positions. The temperature profile determined in this case can be used for regulating the quantity of cooling gas. The temperature sensors are preferably designed for contactless temperature measurement, for example as pyrometers.

In a preferred embodiment of the irradiation device, the gas-permeable reflector wall has a plurality of outlet openings for conducting waste air out of the reflector space. In this case, the number and/or the total opening cross-section of the outlet openings can vary in the transportation direction so that the quantity of waste air discharged from the reflector space can also vary, in particular increase in the transportation direction. One embodiment of the irradiation device is characterized in that the reflector wall adjoins a gas distribution chamber.

The gas-permeable reflector wall closes off the gas distribution chamber on one side. The cooling gas can be introduced into the gas distribution chamber at one point or at a plurality of points, and it flows from there through the inlet openings in the reflector wall into the reflector space. A uniform cooling gas pressure can be set within the gas distribution chamber so that the quantity of the outflowing cooling gas is determined solely by the distribution and opening cross-section of the outlet openings.

In this context, it has also proven advantageous if the gas distribution chamber is divided into a plurality of sub-chambers.

In fluidically separated sub-chambers within the gas distribution chamber, cooling gas pressures that differ from sub-chamber to sub-chamber can be set. The quantity of outflowing cooling gas can thus be changed from sub-chamber to sub-chamber and is determined by the cooling gas pressure and the distribution and the total opening cross-section of the outlet openings in the respective sub-chamber. By means of the subdivision, the quantity of cooling gas flowing through the inlet openings in the reflector wall into the reflector space can vary, for example, from sub-chamber to sub-chamber (as viewed in the transportation direction).

The gas distribution chamber is advantageously connected to a waste air connection via which at least a part of the waste air is discharged from the reflector space. In the case of the gas distribution chamber being divided into a plurality of sub-chambers, it has also proven advantageous if at least one of the sub-chambers is provided with such a waste air connection.

In this case, in addition to the inlet openings, the gas-permeable reflector wall also has one outlet opening or a plurality of outlet openings which open into the sub-chamber with the waste air connection. The waste air can be removed from the reflector space through the outlet openings and introduced into the sub-chamber equipped with the waste air connection and from there discharged to the outside. Due to a separate controllability of the waste air and the cooling gas supply air, an extensive extraction of moisture-laden waste air from the reflector space can be ensured and condensation can be prevented.

In a preferred embodiment of an irradiation device equipped with a gas distribution chamber divided into a plurality of sub-chambers, at least one first of the sub-chambers is provided with a first cooling gas connection via which a first cooling gas stream is supplied to first inlet openings, and a second of the sub-chambers is provided with a second cooling gas connection via which a second cooling gas stream is supplied to second inlet openings, wherein the first cooling gas stream is adjustable independently of the second cooling gas stream.

Advantageously, the irradiation device has, independently of the gas-permeable counter-reflector, a process gas feed unit for introducing process gas into the process chamber and a waste air unit for discharging waste air from the process chamber.

The cooling of the counter-reflector and the interaction of the cooling gas with the material for irradiation can take place independently of a process gas quantity controller, by means of which process gas is introduced into the process chamber via a supply air unit and waste air is discharged from the process chamber via a waste air unit.

Definitions

Reflector Wall

The reflector wall is provided with inlet openings and optionally with outlet openings. It consists of one piece or is composed of a plurality of reflector wall pieces. Optionally, the reflector wall pieces can differ in the areal occupancy of the inlet openings, and optionally also in the areal occupancy of their outlet openings. The reflector wall preferably forms a wall of a gas distribution chamber.

Gas Distribution Chamber

The gas distribution chamber consists of a single chamber, or it is multi-part and is formed by a plurality of sub-chambers. Optionally, the sub-chambers are closed off by a common reflector wall, or each of the sub-chambers has its own reflector wall. The sub-chambers are fluidically connected to one another, or they are fluidically separated from one another and optionally designed for processing different gas quantities and/or gas pressures.

EXEMPLARY EMBODIMENT

Figure 2:
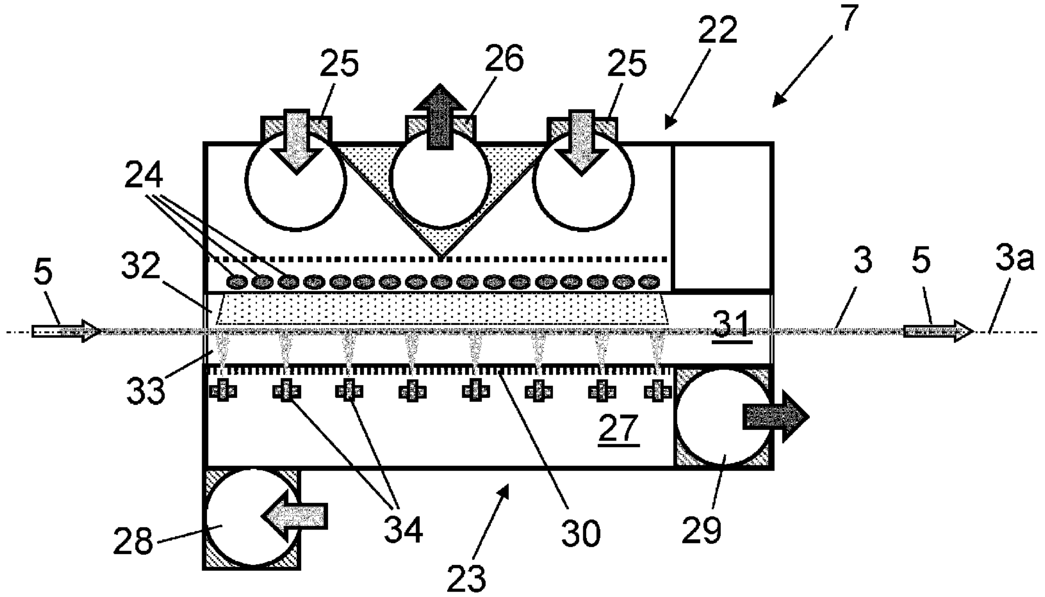
Figure 3:
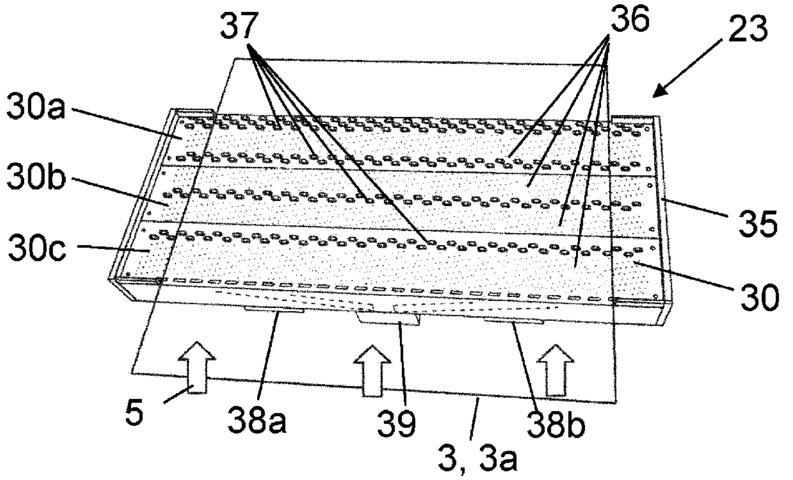
Figure 4:
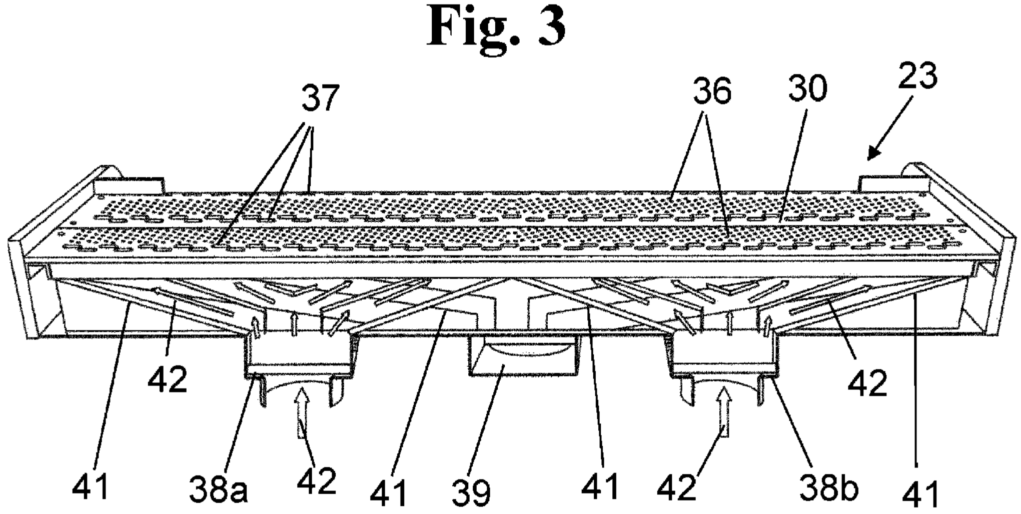
Figure 5:
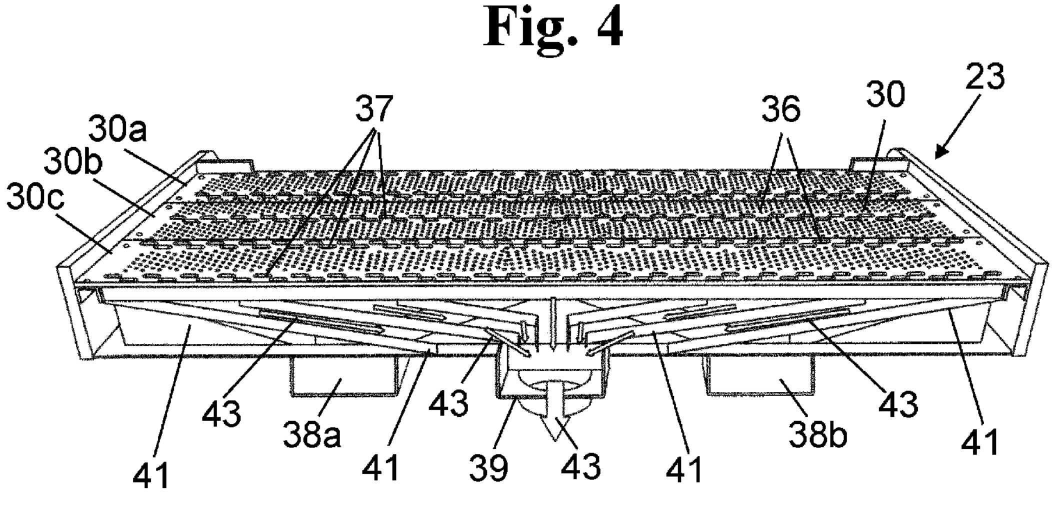
Figure 6:
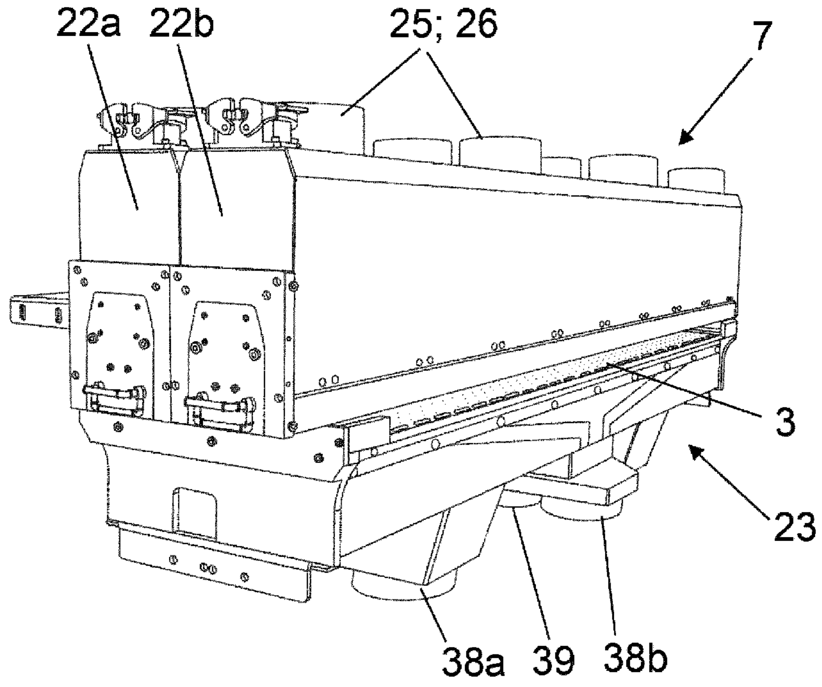
Figure 7:
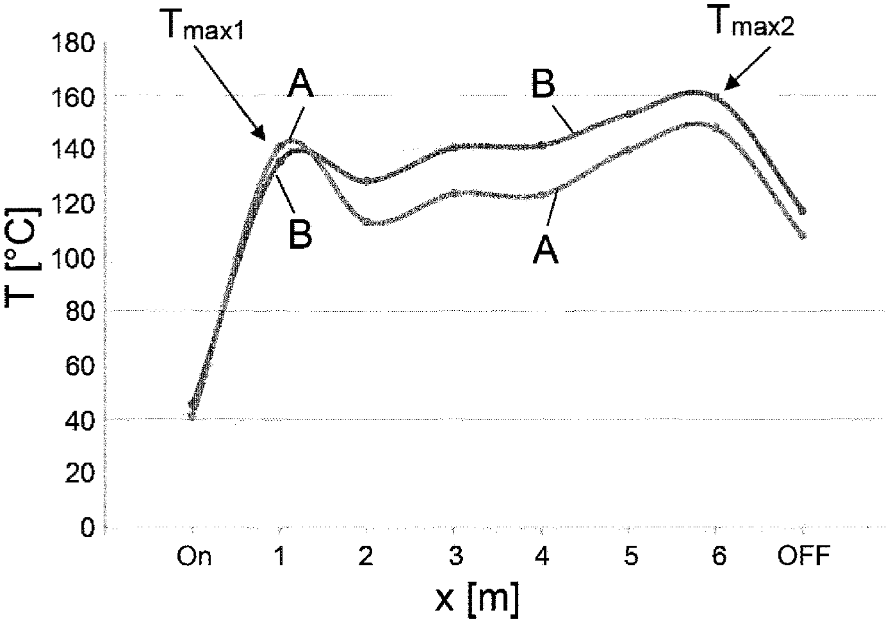

The invention is explained in more detail below with reference to an exemplary embodiment and a patent drawing. In detail, the drawing shows in schematic representation:

FIG. 1 a printing press with a printing unit and an infrared dryer system and a printing substrate being transported along a transportation route and in a transportation direction, FIG. 2 a sketch of an irradiation device as part of the dryer system of the printing press of FIG. 1 in a longitudinal section, FIG. 3 a three-dimensional representation of an embodiment of the gas distribution chamber with material for irradiation moved over it in a top view of the material for irradiation, FIG. 4 a gas distribution chamber of the irradiation device with a drawn-in flow profile of the cooling air, FIG. 5 the gas distribution chamber of the irradiation device with a drawn-in flow profile of the waste air, FIG. 6 a three-dimensional representation of an embodiment of the irradiation device as assembled, and FIG. 7 a diagram with temperature profiles on the surface of the material for irradiation along the process chamber during processing with and without a gas-permeable counter-reflector.

FIG. 1 is a schematic view of a printing press in the form of an inkjet roll printing press, to which as a whole is assigned the reference number 1. Starting from an unwinder 2, the material web 3, consisting of a printing substrate, such as paper, reaches a printing unit 40. The latter comprises a plurality of inkjet print heads 4 which are arranged one behind the other along the material web 3 and by means of which solvent-containing and in particular water-containing printing inks are applied to the printing substrate.

As viewed in the transportation direction 5, the material web 3 subsequently passes from the printing unit 40 via a deflection roller 6 to an infrared dryer system 70. The latter is equipped with a plurality of dryer modules 7 which are designed for drying the solvent into the material web 3. The dryer modules 7 are each equipped with a counter-reflector unit 23 with a gas-permeable counter-reflector and are explained in more detail below with reference to FIGS. 2 to 7.

The further transportation route of the material web 3 proceeds via a draw roller 8 which is equipped with its own traction drive motor and via which the web tension is adjusted, to a take-up roller 9.

A plurality of dryer modules 7 are combined in the dryer system 70. Each of the dryer modules 7 is equipped with a plurality of infrared radiators, eighteen in the exemplary embodiment.

In the case of the infrared radiators, a heating filament made of carbon or tungsten in a spiral or strip form is enclosed in a radiator tube filled with inert gas and usually made of quartz glass. The heating filaments are connected to electrical connections that are introduced via one or both ends of the radiator tube.

In the dryer system, the dryer modules are arranged in pairs next to and behind one another as viewed in the transportation direction. The pair of dryer modules 7 in each case arranged next to one another covers the maximum format width of the printing press 1. In accordance with the dimensions and color assignment of the printing substrate, the dryer modules 7 and the individual infrared radiators are electrically controllable separately from one another.

In an alternative embodiment, the dryer module is equipped with planar infrared radiator panels instead of tubular infrared radiators. The infrared radiator panels comprise a substrate made of a material emitting infrared radiation and are occupied by one conductor track or a plurality of conductor tracks of resistance material for the thermal excitation of the infrared emission. In the case of an occupation with a plurality of conductor tracks, the conductor tracks can be controllable separately from one another in order to produce a non-homogeneous temperature profile over the infrared radiator surface.

The transportation speed of the material web 3 is set to 5 m/s. This is a comparatively high speed which requires high-speed drying. The drying method required to achieve this requirement and the irradiation device used for this purpose are explained in more detail below with reference to FIGS. 2 to 7. Insofar as the same reference signs are used in these figures as in FIG. 1, they denote structurally identical or equivalent components and parts as are explained in more detail above with reference to the description of the printing press.

The sketch in FIG. 2 shows an irradiation device arranged on the material web 3 in the form of a dryer module 7. The dryer module 7 is composed of a radiator unit 22 and a counter-reflector unit 23, separated from one another by the material web 3 that is moved in the transportation plane 3*a*.

The radiator unit 22 is equipped with a plurality of elongated infrared radiators 24, whose longitudinal axes run perpendicularly to the transportation direction 5 and are arranged in parallel to one another. The radiator unit 22 is equipped with its own air management system which comprises a supply air unit 25 for the supply of drying air and a waste air unit 26 for the discharge of spent air. The supply air and waste air units (25; 26) are independent of the counter-reflector unit 23 described in more detail below and serve in particular for dissipating excess heat in the rear space of the radiator unit 22 in order to protect the surrounding parts of the printing press 1 from overheating.

The counter-reflector unit 23 comprises a gas distribution chamber 27 which is equipped with an air inlet 28, an air outlet 29 and a reflector plate 30 provided with a plurality of through-holes. The gas-permeable reflector plate 30 is a wall of the gas distribution chamber 27 facing the material web 3. It delimits the gas distribution chamber 27 upward and the reflector space 33 downward. A plurality of pyrometers 34 are arranged within the gas distribution chamber 27 and are distributed along the reflector plate 30 in the transportation direction 5 and are designed to measure the temperature of the underside of the material web.

The material web 3 is moved in the transportation direction 5 in the transportation plane 3*a* through a treatment space (=process chamber 31) of the dryer module 7. The transportation plane 3*a* divides the process chamber 31 into an irradiation space 32 facing the radiator unit 22 and a reflector space 33 facing the counter-reflector unit 23.

FIG. 3 shows a three-part counter-reflector unit 23. The counter-reflector unit is constructed in a modular manner from three reflector chambers fluidically connected to one another and is surrounded by a common, one-piece frame 35. From the plan view of the material web 3 (which simultaneously defines the transportation plane 3*a*) and of the counter-reflector unit 23, the reflector plate 30 can be seen, which in this embodiment is composed of three reflector plate fields 30*a*, 30*b*, 30*c* with in each case a different distribution of inlet and outlet openings (36; 37).

The reflector plate 30 has a plurality of the through-holes, which are divided into small, closely distributed circular inlet openings 36 and into oval outlet openings 37. As viewed from bottom to top (i.e., in the transportation direction 5), thirteen rows of circular inlet openings 36 that are offset relative to one another are provided, followed by two rows of oval outlet openings 37. Then come eleven rows of inlet openings 36, again two rows of outlet openings 37, another ten rows of inlet openings 36, another two rows of outlet openings 37, another ten rows of inlet openings 36, and finally three rows of oval outlet openings 37. The circular inlet openings 36 have an internal diameter of 4 mm, and the oval outlet openings 37 have an opening cross-section of 353 $mm^2$.

The number of outlet openings 37 and/or the total opening cross-section of the outlet openings 37 thus increases in the transportation direction 5 so that in this direction more moisture-laden or spent cooling gas is discharged as waste air from the reflector space 33 into the air outlet 29 of the counter-reflector unit 23.

The inlet openings 36 are fluidically connected to two gas inlet connectors 38*a*; 38*b* (more clearly visible in FIG. 4) of the gas distribution chamber 27 for the supply of dry air into the reflector space 33. The outlet openings 37 are fluidically connected to a gas outlet connector 39 (more clearly visible in FIG. 5) of the gas distribution chamber 27 for the discharge of spent air from the reflector space 33.

The opening dimensions and the number and distribution of the through-holes 36; 37 are adapted to the type of product to be irradiated and to the radiator power. It is important to find a balance: on the one hand, the temperature of the material for irradiation increases in the transportation direction so that a number of inlet openings 36 is required for adequate and uniform cooling; on the other hand, the air humidity also steadily increases so that a certain number of outlet openings 37 is also required. As a rule, the areal occupancy of the outlet openings 37 increases in the transportation direction and the areal occupancy of the inlet openings 36 is inevitably reduced as a result. In order to obtain an optimal drying result, the specific design can be optimized on the basis of the above information and the exemplary embodiment for the application, the type of radiator and the radiator power, for example empirically by practical experiments and/or theoretically using simulations.

The reflector plate 30 is suitable for the reflection of infrared radiation and the reflector plate material itself is to be heat-resistant and preferably also heat-conducting. In the exemplary embodiment, the reflector layer 30 is made of anodized aluminum. Alternatively, the reflector plate 30 consists of aluminum with a metallic surface, stainless steel, in particular polished stainless steel or other metals, in particular of noble metals or of a workpiece which is coated with one of the materials mentioned. As viewed in the transportation direction 5, the areal occupancy of the outlet openings 37 increases and that of the inlet openings 36 decreases.

The three-dimensional views of the counter-reflector unit 23 in FIG. 4 and FIG. 5 show that the gas distribution chamber 27 is divided by means of partition walls 41 into a plurality of sub-chambers, of which two are in each case connected to one of the gas inlet connectors 38*a*; 38*b*, and the third sub-chamber is connected to the gas outlet connector 39. The flow lines 42 in FIG. 4 indicate the distribution of the dry cooling air from the two gas inlet connectors 38*a*; 38*b* to the inlet openings 36. In FIG. 5, the flow lines 43 indicate the distribution of the spent waste air from the outlet openings 37 to the gas outlet connector 39. The supply of the dry cooling air via the gas inlet connectors 38*a*; 38*b* and the discharge of the spent waste air via the gas outlet connector 39 can be regulated separately from one another.

FIG. 6 shows a dryer module 7 in the assembly of two radiator units 22*a*, 22*b* and a two-part counter-reflector unit 23.

A procedure for carrying out the method according to the invention is explained in more detail below.

In order to reduce the blustering effect and to improve the efficiency of radiation heat transfer between the infrared radiators 24 of the radiator unit 22 and the printing ink to be dried on the material web 3, the counter-reflector unit 23 is used with a gas-permeable reflector plate 30. The cooling air flowing from the inlet openings 36 of the reflector plate 30 against the uncoated underside of the material web 3 causes a uniform temperature development in the printing substrate (paper). This is helped by the fact that a plurality of reflector plate fields 30*a*, 30*b*, 30*c* with an adapted distribution of inlet openings 36 and outlet openings 37 is used. When the material web 3 enters the process chamber 31, the quantity of waste air extracted is comparatively small and increases up to the exit from the process chamber 31.

FIG. 7 shows the difference in the temperature distribution in the case of a material web, during irradiation using a gas-permeable counter-reflector with and without cooling air. In the diagram, the temperature on the underside of the material web measured by means of the pyrometer 34 (in ° C.) is plotted against the position number of the pyrometer as viewed in the transportation direction 5 between the entry of the material web 3 into the process chamber and its exit from the process chamber. Curve A shows the temperature profile when using the counter-reflector with cooling air, and curve B shows the temperature profile when using the counter-reflector without cooling air. Both temperature profiles show maximum temperatures shortly after the entry $T_{max1}$ of the material web into the process chamber, and shortly before its exit $T_{max2}$. It can be seen that using cooling air directed against the unprinted side of the paper sheet results in an overall more homogeneous temperature profile with less drift of the maximum temperatures $T_{max1}$ and $T_{max2}$ (curve A) than without this measure. In addition, the maximum temperature at curve A is significantly below the maximum value of curve B. In this example, the difference between the maximum temperatures of curves A and B is about 10° C. Curve A remains below 150° C., which in this example can be regarded as a threshold value for bubble formation. Cooling the rear side of the printing substrate prevents not only the highly absorbent ink surfaces from becoming comparatively hot and possibly overheated. The cooling of the rear side of the material web 3 by the inflowing cooling air counteracts a too rapid and excessive heating of the material for irradiation between reaching the gel point and reaching the critical point, which contributes to a comparatively gentle drying of the material for irradiation in the first drying phase. A comparatively more homogeneous temperature profile is established. As a result, the radiation power and thus the transportation speed can be increased without damaging the material for irradiation thereon.

LIST OF REFERENCE SIGNS

Inkjet printing press 1
Unwinder 2
Material web 3
Transportation plane 3*a*
Printing unit 40
Inkjet print heads 4
Transportation direction 5
Deflection roller 6
Infrared dryer system 70
Dryer modules 7
Draw roller 8
Take-up roller 9
Radiator unit 22
Radiator units 22*a*; 22*b*
Counter-reflector unit 23
Infrared radiators 24
Supply air unit 25
Waste air unit 26
Gas distribution chamber 27
Air inlet 28
Air outlet 29
Reflector plate 30
Reflector plate fields 30*a*, 30*b*, 30*c*
Process chamber 31
Irradiation space 32
Reflector space 33
Pyrometer 34
Frame 35
Reflector plate 30
Inlet openings 36
Outlet openings 37
Gas inlet connector 38*a*; 38*b*
Gas outlet connector 39
Partition walls 41

The invention claimed is:

1. Infrared irradiation device for drying a material for irradiation that is moved through a process chamber in a transportation direction and in a transportation plane, wherein the transportation plane divides the process chamber into an irradiation space and into a reflector space, having a radiator unit with at least one infrared radiator for emitting infrared radiation into the irradiation space, and having a counter-reflector with a reflector wall facing the transportation plane, wherein the reflector wall has a plurality of inlet openings for admitting cooling gas into the reflector space, wherein the reflector wall has at least one outlet opening for conducting waste air out of the reflector space through the reflector wall.

2. Irradiation device according to claim 1, wherein a number of and/or a total opening cross-section of the plurality of inlet openings varies as viewed in the transportation direction.

3. Irradiation device according to claim 2, wherein the reflector wall is divided into a plurality of sections as viewed in the transportation direction and that the number of and/or the total opening cross-section of the plurality of inlet openings varies from section to section.

4. Irradiation device according to claim 1, wherein the reflector wall has a plurality of outlet openings for conducting waste air out of the reflector space.

5. Irradiation device according to claim 4, wherein a number of and/or a total opening cross-section of the plurality of outlet openings varies in the transportation direction.

6. Irradiation device according to claim 1, wherein a plurality of temperature sensors is distributed along the reflector wall as viewed in the transportation direction.

7. Irradiation device according to claim 1, wherein the reflector wall adjoins a gas distribution chamber.

8. Irradiation device according to claim 7, wherein the gas distribution chamber is divided into a plurality of sub-chambers.

9. Irradiation device according to claim 8, wherein at least one first sub-chamber of the plurality of sub-chambers is provided with a first cooling gas connection via which a first cooling gas stream is supplied to first inlet openings, and in that a second sub-chamber of the plurality of sub-chambers is provided with a second cooling gas connection via which a second cooling gas stream is supplied to second inlet openings, wherein the first cooling gas stream can be adjusted independently of the second cooling gas stream.

10. Irradiation device according to claim 7, wherein the gas distribution chamber is provided with a waste air connection that is fluidically connected to one or more of the at least one outlet opening.

11. Irradiation device according to claim 1, wherein a process gas supply unit for introducing process gas into the process chamber and a waste air unit for discharging waste air from the process chamber are provided.

12. Method for at least partially drying a material for irradiation that is moved through a process chamber in a transportation direction and in a transportation plane, wherein the transportation plane divides the process chamber into an irradiation space and into a reflector space, comprising the method steps:

(a) Emitting infrared radiation in a direction of the material for irradiation by means of a radiator unit comprising at least one infrared radiator, and (b) Reflecting infrared radiation back onto the material for irradiation by means of a counter-reflector which has a reflector wall facing the transportation plane, wherein a cooling gas is introduced into the reflector space via inlet openings in the reflector wall, wherein waste air is discharged from the reflector space through the reflector wall via at least one outlet opening in the reflector wall.

13. Method according to claim 12, wherein a quantity of the cooling gas introduced into the reflector space varies as viewed in the transportation direction.

14. Method according to claim 12, wherein waste air is discharged from the reflector space via a plurality of outlet openings in the reflector wall.

15. Method according to claim 14, wherein a number of and/or a total opening cross-section of the plurality of outlet openings varies in the transportation direction.

16. Method according to claim 12, wherein a temperature of the material for irradiation is measured at a plurality of positions distributed along the process chamber in the transportation direction at 2 to 8 positions, and the resulting measured values are used to regulate a quantity of the cooling gas.

17. Method according to claim 16, wherein the temperature of the material for irradiation is measured at a plurality of positions distributed along the process chamber in the transportation direction at 2 to 5 positions.

18. Method according to claim 12, wherein the cooling gas flows through the inlet openings into the reflector space from a gas distribution chamber adjoining the reflector wall.

19. Method according to claim 18, wherein the gas distribution chamber is divided into a plurality of sub-chambers, wherein a quantity of the cooling gas flowing into the reflector space through inlet openings varies from sub-chamber to sub-chamber as viewed in the transportation direction.

20. Method according to claim 19, wherein at least one first sub-chamber of the plurality of sub-chambers is provided with a first cooling gas connection via which a first cooling gas stream is supplied to first inlet openings, and in that a second sub-chamber of the plurality of sub-chambers is provided with a second cooling gas connection via which a second cooling gas stream is supplied to second inlet openings, wherein the first cooling gas stream is adjustable independently of the second cooling gas stream.

21. Method according to claim 18, wherein the gas distribution chamber is provided with a waste air connection via which at least a part of the waste air is discharged from the reflector space.

22. Method according to claim 12, wherein by means of a process gas quantity controller, process gas is introduced into the process chamber via a supply air unit and waste air is discharged from the process chamber via a waste air unit.

* * * * *